US012802234B2

(12) United States Patent
Adams et al.

(10) Patent No.: US 12,802,234 B2
(45) Date of Patent: Nov. 17, 2026

(54) SYSTEM AND METHOD FOR UNSUPERVISED SEGMENTATION OF IMAGES USING MAGNETIC RESONANCE FINGERPRINTING

(71) Applicant: Case Western Reserve University, Cleveland, OH (US)

(72) Inventors: Richard James Adams, Cleveland, OH (US); Dan Ma, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 303 days.

(21) Appl. No.: 18/656,541

(22) Filed: May 6, 2024

(65) Prior Publication Data

US 2024/0371003 A1 Nov. 7, 2024

Related U.S. Application Data

(60) Provisional application No. 63/500,194, filed on May 4, 2023.

(51) Int. Cl.
*G06T 7/11* (2017.01)

(52) U.S. Cl.
CPC ...... *G06T 7/11* (2017.01); *G06T 2207/10088* (2013.01); *G06T 2207/30016* (2013.01)

(58) Field of Classification Search
CPC ... G06T 7/10; G06T 7/11; G06T 2207/10088; G06T 2207/30004; G06T 2207/30016;
(Continued)

(56) References Cited

U.S. PATENT DOCUMENTS 8,723,518 B2 5/2014 Seiberlich et al.
2015/0301141 A1 10/2015 Griswold et al.
(Continued)

FOREIGN PATENT DOCUMENTS

WO WO-2022076367 A1 * 4/2022 ............... G06T 7/11

OTHER PUBLICATIONS

Al-Dmour, H. and Al-Ani, A., Nov. 2016. MR brain image segmentation based on unsupervised and semi-supervised fuzzy clustering methods. In 2016 international conference on digital image computing: techniques and applications (DICTA) (pp. 1-7). IEEE. (Year: 2016).*

(Continued)

*Primary Examiner* — Oneal R Mistry
*Assistant Examiner* — Duy Tran
(74) *Attorney, Agent, or Firm* — Quarles & Brady LLP

(57) ABSTRACT

A method for generating segmented images of a region of interest of a subject using magnetic resonance fingerprinting (MRF) includes receiving MRF data and a plurality of quantitative parameter maps generated using the MRF data, deriving a first set of image features based on the plurality of quantitative parameter maps and the MRF data, performing unsupervised clustering on each image feature in the first set of image features to generate a first set of clusters, determining a loss for each image feature and the associated cluster for the image feature, selecting a second set of image features based on the determined loss for each image feature, performing unsupervised clustering on the second set of image features to produce a second set of clusters, generating a non-background cluster with low probability voxels, and generating a segmented image based on the second set of clusters and the non-background cluster.

20 Claims, 8 Drawing Sheets

(58) Field of Classification Search
CPC ........ G06T 2207/20081; G06V 30/191; G06V 30/19107; G06V 30/19113; G06V 2201/03; G06V 10/40; G06V 10/751
See application file for complete search history.

(56) References Cited

U.S. PATENT DOCUMENTS

| | | | | |
|---|---|---|---|---|
| 2017/0084060 | A1* | 3/2017 | Bal | G06F 18/23213 |
| 2018/0372825 | A1* | 12/2018 | Griswold | G01R 33/5608 |
| 2020/0167930 | A1* | 5/2020 | Wang | G06T 7/0012 |
| 2022/0230310 | A1* | 7/2022 | Xie | G06T 7/12 |
| 2022/0405932 | A1* | 12/2022 | Gaskill-Shipley | A61B 5/055 |

OTHER PUBLICATIONS

Ashburner, John, and Karl J. Friston. "Unified segmentation." Neuroimage 26.3 (2005): 839-851.

Balafar, Mohd Ali, et al. "Review of brain MRI image segmentation methods." Artificial Intelligence Review 33 (2010): 261-274.

Deshmane, Anagha, et al. "Partial volume mapping using magnetic resonance fingerprinting." NMR in Biomedicine 32.5 (2019): e4082.

Devi, Chelli N., et al. "Neonatal brain MRI segmentation: A review." Computers in biology and medicine 64 (2015): 163-178.

Ma, Dan, et al. "Magnetic resonance fingerprinting." Nature 495. 7440 (2013): 187-192.

McGivney, Debra F., et al. "SVD compression for magnetic resonance fingerprinting in the time domain." IEEE transactions on medical imaging 33.12 (2014): 2311-2322.

McInnes, Leland, and John Healy. "Accelerated hierarchical density based clustering." 2017 IEEE International Conference on Data Mining Workshops (ICDMW). IEEE, 2017.

Shi, Feng, et al. "Infant brain atlases from neonates to 1-and 2-year-olds." PloS one 6.4 (2011): e18746.

Singh, Mahender Kumar, and Krishna Kumar Singh. "A review of publicly available automatic brain segmentation methodologies, machine learning models, recent advancements, and their comparison." Annals of Neurosciences 28.1-2 (2021): 82-93.

* cited by examiner

SYSTEM AND METHOD FOR UNSUPERVISED SEGMENTATION OF IMAGES USING MAGNETIC RESONANCE FINGERPRINTING

CROSS-REFERENCE TO RELATED APPLICATIONS

This application is based on, claims priority to, and incorporates herein by reference in its entirety U.S. Ser. No. 63/500,194 filed May 4, 2023, and entitled "System And Method For Unsupervised Segmentation Of Images Using Magnetic Resonance Fingerprinting."

STATEMENT REGARDING FEDERALLY SPONSORED RESEARCH

This invention was made with government support under NS109439 and CA269604 awarded by the National Institutes of Health. The government has certain rights in the invention.

BACKGROUND

Segmentation of various region of the anatomy of a patient can present challenges. For example, neonatal brain segmentation faces several limitations. MR contrast in neonates is approximately half that of adults, making it difficult to discern tissue boundaries. Supervised learning of segmentation requires tedious manual segmentation of ground truths, and neonatal training data is difficult to acquire. Atlas-based segmentation uses atlases of expected brain shape and image intensity with assumptions about tissue types to impose segmentation expectations on input images. However, rapid changes to tissue properties and shapes during developmental growth of infants can make atlas-based modeling difficult. The atlas-based segmentation technique struggles to generalize infants, as $T_1$- and $T_2$-weighted contrasts and morphometry vary by month of age and infant atlases with one-month temporal resolution are unavailable. Atlas-based segmentation is also restricted to segmenting tissue types in the atlas and may incompletely classify partial volume voxels with multiple tissue types or unique tissues like myelin.

SUMMARY OF THE DISCLOSURE

In accordance with an embodiment, a method for generating segmented images of a region of interest of a subject using magnetic resonance fingerprinting (MRF), includes receiving MRF data and a plurality of quantitative parameter maps generated using the MRF data, deriving a first set of image features based on the plurality of quantitative parameter maps and the MRF data, performing unsupervised clustering on each image feature in the first set of image features to generate a first set of clusters, determining a loss for each image feature in the first set of image features and the associated cluster for the image feature, selecting a second set of image features based on the determined loss for each image feature in the first set of image features, performing unsupervised clustering on the second set of image features to produce a second set of clusters, generating a non-background cluster with low probability voxels, and generating a segmented image based on the second set of clusters and the non-background cluster.

In accordance with another embodiment, a magnetic resonance imaging (MRI) system includes a magnet system configured to generate a polarizing magnetic field about at lease a portion of a subject, a magnetic gradient system including a plurality of magnetic gradient coils configured to apply at least one magnetic gradient field to the polarizing magnetic field, a radio frequency (RF) system configured to apply an RF excitation field to the subject, and to receive magnetic resonance signals from the subject using a coil array, and at least one processor. The at least one processor can be configured to direct the plurality of magnetic gradient coils and the RF system to perform a magnetic resonance fingerprinting (MRF) pulse sequence to acquire MRF data, generate a plurality of quantitative parameter maps using the acquired MRF data, derive a first set of image features based on the plurality of quantitative parameter maps and the MRF data, perform unsupervised clustering on each image feature in the first set of image features to generate a first set of clusters, determine a loss for each image feature in the first set of image features and the associated cluster for the image feature, select a second set of image features based on the determined loss for each image feature in the first set of image features, perform unsupervised clustering on the second set of image features to produce a second set of clusters, generate a non-background cluster with low probability voxels, and generate a segmented image based on the second set of clusters and the non-background cluster.

In accordance with another embodiment, a non-transitory, computer readable medium storing instructions that, when executed by one or more processors, perform a set of functions including receiving MRF data and a plurality of quantitative parameter maps generated using the MRF data, deriving a first set of image features based on the plurality of quantitative parameter maps and the MRF data, performing unsupervised clustering on each image feature in the first set of image features to generate a first set of clusters, determining a loss for each image feature in the first set of image features and the associated cluster for the image feature, selecting a second set of image features based on the determined loss for each image feature in the first set of image features. performing unsupervised clustering on the second set of image features to produce a second set of clusters, generating a non-background cluster with low probability voxels, and generating a segmented image based on the second set of clusters and the non-background cluster.

BRIEF DESCRIPTION OF THE DRAWINGS

The present invention will hereafter be described with reference to the accompanying drawings, wherein like reference numerals denote like elements.

DETAILED DESCRIPTION

Figure 1:
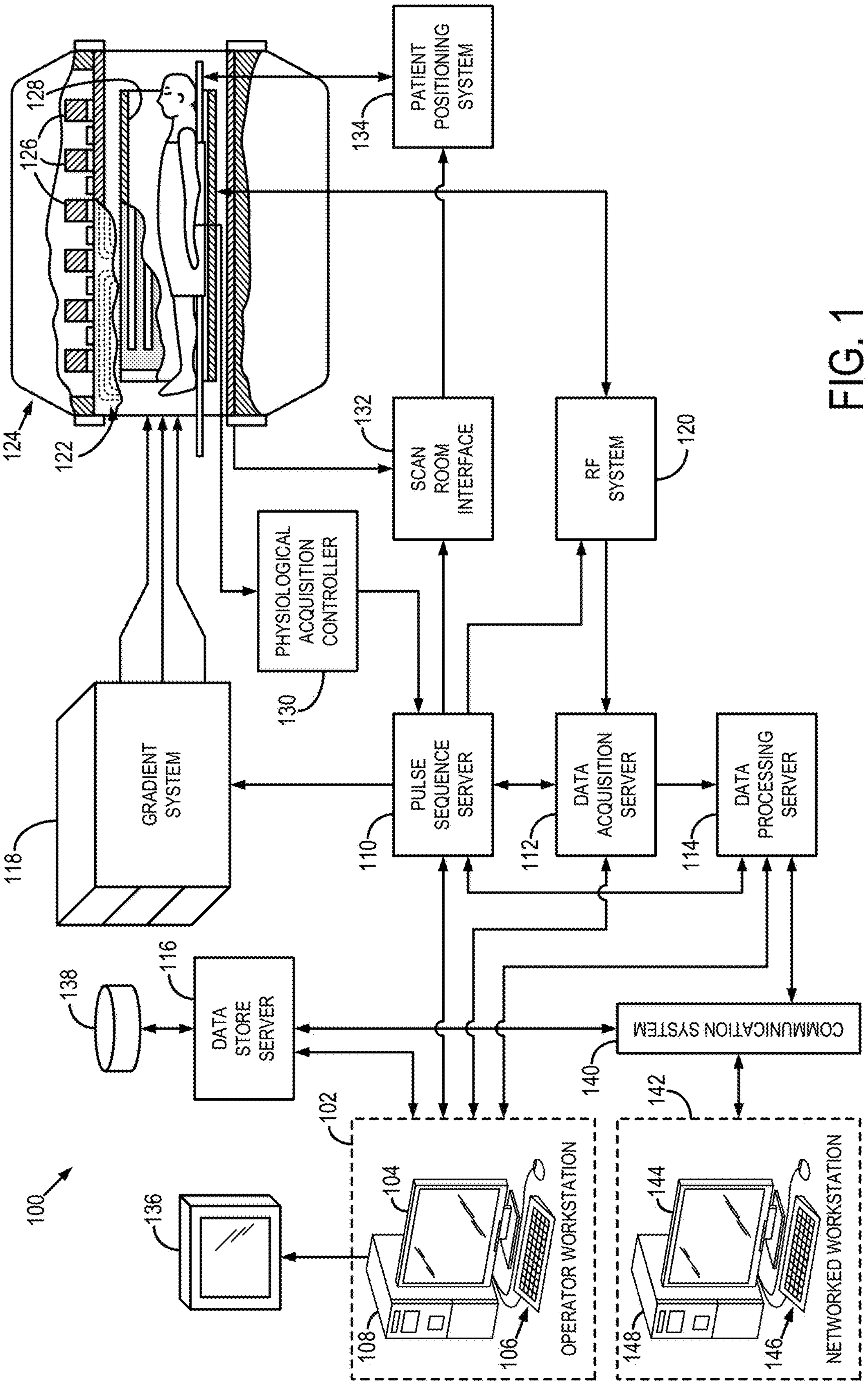
FIG. 1 is a schematic diagram of an example MRI system in accordance with an embodiment.

Magnetic resonance fingerprinting ("MRF") is a technique that facilitates mapping of tissue or other material properties based on random or pseudorandom measurements of the subject or object being imaged. In particular, MRF can be conceptualized as evolutions in different "resonant species" to which the RF is applied. The term "resonant species," as used herein, refers to a material, such as water, fat, bone, muscle, soft tissue, and the like, that can be made to resonate using NMR. By way of illustration, when radio frequency ("RF") energy is applied to a volume that has both bone and muscle tissue, then both the bone and muscle tissue will produce a nuclear magnetic resonance ("NMR") signal; however, the "bone signal" represents a first resonant species and the "muscle signal" represents a second resonant species, and thus the two signals will be different. These different signals from different species can be collected simultaneously over a period of time to collect an overall "signal evolution" for the volume.

The measurements obtained in MRF techniques are achieved by varying the acquisition parameters from one repetition time ("TR") period to the next, which creates a time series of signals with varying contrast. Examples of acquisition parameters that can be varied include flip angle ("FA"), RF pulse phase, TR, echo time ("TE'), and sampling patterns, such as by modifying one or more readout encoding gradients. The acquisition parameters are varied in a random manner, pseudorandom manner, or other manner that results in signals from different materials or tissues to be spatially incoherent, temporally incoherent, or both. For example, in some instances, the acquisition parameters can be varied according to a non-random or non-pseudorandom pattern that otherwise results in signals from different materials or tissues to be spatially incoherent, temporally incoherent, or both.

From these measurements, which as mentioned above may be random or pseudorandom, or may contain signals from different materials or tissues that are spatially incoherent, temporally incoherent, or both, MRF processes can be designed to map any of a wide variety of parameters or properties. Examples of such parameters or properties that can be mapped may include, but are not limited to, tissue parameters or properties such as longitudinal relaxation time ($T_1$), transverse relaxation time ($T_2$), and proton density ($\rho$), and device dependent parameters such as main or static magnetic field map ($B_0$). MRF is generally described in U.S. Pat. No. 8,723,518 and Published U.S. Patent Application No. 2015/0301141, each of which is incorporated herein by reference in its entirety.

The data acquired with MRF techniques are compared with a dictionary of signal models, or templates, that have been generated for different acquisition parameters from magnetic resonance signal models, such as Bloch equation-based physics simulations. This comparison allows estimation of the physical properties, such as those mentioned above. As an example, the comparison of the acquired signals to a dictionary can be performed using any suitable matching or pattern recognition technique. The properties for the tissue or other material in a given voxel are estimated to be the values that provide the best signal template matching. For instance, the comparison of the acquired data with the dictionary can result in the selection of a signal vector, which may constitute a weighted combination of signal vectors, from the dictionary that best corresponds to the observed signal evolution. The selected signal vector includes values for multiple different quantitative properties, which can be extracted from the selected signal vector and used to generate the relevant quantitative property maps.

The stored signals and information derived from reference signal evolutions may be associated with a potentially very large data space. The data space for signal evolutions can be partially described by:

$$SE = \sum_{s=1}^{N_S} \prod_{i=1}^{N_A} \sum_{j=1}^{N_{RF}} R_i(\alpha) R_{RF_{ij}}(\alpha, \phi) R(G) E_i(T_1, T_2, D) M_0; \tag{1}$$

where SE is a signal evolution; $N_S$ is a number of spins; $N_A$ is a number of sequence blocks; $N_{RF}$ is a number of RF pulses in a sequence block; $\alpha$ is a flip angle; $\phi$ is a phase angle; $R_i(\alpha)$ is a rotation due to off resonance; $R_{RF_{ij}}(\alpha,\phi)$ is a rotation due to RF differences; R(G) is a rotation due to a magnetic field gradient; $T_1$ is a longitudinal, or spin-lattice, relaxation time; $T_2$ is a transverse, or spin-spin, relaxation time; D is diffusion relaxation; $E_i(T_1,T_2,D)$ is a signal decay due to relaxation differences; and $M_0$ is the magnetization in the default or natural alignment to which spins align when placed in the main magnetic field.

While $E_i(T_1,T_2,D)$ is provided as an example, in different situations, the decay term, $E_i(T_1,T_2,D)$, may also include additional terms, $E_i(T_1,T_2,D, \ldots)$ or may include fewer terms, such as by not including the diffusion relaxation, as $E_i(T_1,T_2)$ or $E_i(T_1,T_2, \ldots)$. Also, the summation on "j" could be replace by a product on "j". The dictionary may store signals described by, $$S_i = R_i E_i(S_{i-1}); \tag{2}$$

where $S_0$ is the default, or equilibrium, magnetization; $S_i$ is a vector that represents the different components of magnetization, $M_x$, $M_y$, and $M_z$ during the $i^{th}$ acquisition block; $R_i$ is a combination of rotational effects that occur during the $i^{th}$ acquisition block; and $E_i$ is a combination of effects that alter the amount of magnetization in the different states for the $i^{th}$ acquisition block. In this situation, the signal at the $i^{th}$ acquisition block is a function of the previous signal at acquisition block (i.e., the $(i-1)^{th}$ acquisition block). Additionally or alternatively, the dictionary may store signals as a function of the current relaxation and rotation effects and of previous acquisitions. Additionally or alternatively, the dictionary may store signals such that voxels have multiple resonant species or spins, and the effects may be different for every spin within a voxel. Further still, the dictionary may store signals such that voxels may have multiple resonant species or spins, and the effects may be different for spins within a voxel, and thus the signal may be a function of the effects and the previous acquisition blocks.

Thus, in MRF, a unique signal timecourse is generated for each pixel. This timecourse evolves based on both physiological tissue properties such as T1 or T2 as well as acquisition parameters like flip angle (FA) and repetition time (TR). This signal timecourse can, thus, be referred to as a signal evolution and each pixel can be matched to an entry in the dictionary, which is a collection of possible signal evolutions or timecourses calculated using a range of possible tissue property values and knowledge of the quantum physics that govern the signal evolution. Upon matching the measured signal evolution/timecourse to a specific dictionary entry, the tissue properties corresponding to that dictionary entry can be identified. A fundamental criterion in MRF is that spatial incoherence be maintained to help separate signals that are mixed due to undersampling. In other words, signals from various locations should differ from each other, in order to be able to separate them when aliased.

To achieve this process, a magnetic resonance imaging (MRI) system or nuclear magnetic resonance (NMR) system may be utilized. FIG. 1 shows an example of an MRI system 100 that may be used to perform magnetic resonance fingerprinting. In addition, MRI system 100 may be used to implement the methods described herein. MRI system 100 includes an operator workstation 102, which may include a display 104, one or more input devices 106 (e.g., a keyboard, a mouse), and a processor 108. The processor 108 may include a commercially available programmable machine running a commercially available operating system. The operator workstation 102 provides an operator interface that facilitates entering scan parameters into the MRI system 100. The operator workstation 102 may be coupled to different servers, including, for example, a pulse sequence server 110, a data acquisition server 112, a data processing server 114, and a data store server 116. The operator workstation 102 and the servers 110, 112, 114, and 116 may be connected via a communication system 140, which may include wired or wireless network connections.

The pulse sequence server 110 functions in response to instructions provided by the operator workstation 102 to operate a gradient system 118 and a radiofrequency ("RF") system 120. Gradient waveforms for performing a prescribed scan are produced and applied to the gradient system 118, which then excites gradient coils in an assembly 122 to produce the magnetic field gradients $G_x$, $G_y$, and $G_z$ that are used for spatially encoding magnetic resonance signals. The gradient coil assembly 122 forms part of a magnet assembly 124 that includes a polarizing magnet 126 and a whole-body RF coil 128.

RF waveforms are applied by the RF system 120 to the RF coil 128, or a separate local coil to perform the prescribed magnetic resonance pulse sequence. Responsive magnetic resonance signals detected by the RF coil 128, or a separate local coil, are received by the RF system 120. The responsive magnetic resonance signals may be amplified, demodulated, filtered, and digitized under direction of commands produced by the pulse sequence server 110. The RF system 120 includes an RF transmitter for producing a wide variety of RF pulses used in MRI pulse sequences. The RF transmitter is responsive to the prescribed scan and direction from the pulse sequence server 110 to produce RF pulses of the desired frequency, phase, and pulse amplitude waveform. The generated RF pulses may be applied to the whole-body RF coil 128 or to one or more local coils or coil arrays.

The RF system 120 also includes one or more RF receiver channels. An RF receiver channel includes an RF preamplifier that amplifies the magnetic resonance signal received by the coil 128 to which it is connected, and a detector that detects and digitizes the I and Q quadrature components of the received magnetic resonance signal. The magnitude of the received magnetic resonance signal may, therefore, be determined at a sampled point by the square root of the sum of the squares of the I and Q components:

$$M = \sqrt{I^2 + Q^2}; \tag{3}$$

and the phase of the received magnetic resonance signal may also be determined according to the following relationship:

$$\varphi = \tan^{-1}\left(\frac{Q}{I}\right). \tag{4}$$

The pulse sequence server 110 may receive patient data from a physiological acquisition controller 130. By way of example, the physiological acquisition controller 130 may receive signals from a number of different sensors connected to the patient, including electrocardiogram ("ECG") signals from electrodes, or respiratory signals from a respiratory bellows or other respiratory monitoring devices. These signals may be used by the pulse sequence server 110 to synchronize, or "gate," the performance of the scan with the subject's heartbeat or respiration.

The pulse sequence server 110 may also connect to a scan room interface circuit 132 that receives signals from various sensors associated with the condition of the patient and the magnet system. Through the scan room interface circuit 132, a patient positioning system 134 can receive commands to move the patient to desired positions during the scan.

The digitized magnetic resonance signal samples produced by the RF system 120 are received by the data acquisition server 112. The data acquisition server 112 operates in response to instructions downloaded from the operator workstation 102 to receive the real-time magnetic resonance data and provide buffer storage, so that data is not lost by data overrun. In some scans, the data acquisition server 112 passes the acquired magnetic resonance data to the data processor server 114. In scans that require information derived from acquired magnetic resonance data to control the further performance of the scan, the data acquisition server 112 may be programmed to produce such information and convey it to the pulse sequence server 110. For example, during pre-scans, magnetic resonance data may be acquired and used to calibrate the pulse sequence performed by the pulse sequence server 110. As another example, navigator signals may be acquired and used to adjust the operating parameters of the RF system 120 or the gradient system 118, or to control the view order in which k-space is sampled. In still another example, the data acquisition server 112 may also process magnetic resonance signals used to detect the arrival of a contrast agent in a magnetic resonance angiography ("MRA") scan. For example, the data acquisition server 112 may acquire magnetic resonance data and processes it in real-time to produce information that is used to control the scan.

The data processing server 114 receives magnetic resonance data from the data acquisition server 112 and processes the magnetic resonance data in accordance with instructions provided by the operator workstation 102. Such processing may include, for example, reconstructing two-dimensional or three-dimensional images by performing a Fourier transformation of raw k-space data, performing other image reconstruction algorithms (e.g., iterative or backprojection reconstruction algorithms), applying filters to raw k-space data or to reconstructed images, generating functional magnetic resonance images, or calculating motion or flow images.

Images reconstructed by the data processing server 114 are conveyed back to the operator workstation 102 for storage. Real-time images may be stored in a data base memory cache, from which they may be output to operator display 102 or a display 136. Batch mode images or selected real time images may be stored in a host database on disc storage 138. When such images have been reconstructed and transferred to storage, the data processing server 114 may notify the data store server 116 on the operator workstation 102. The operator workstation 102 may be used by an operator to archive the images, produce films, or send the images via a network to other facilities.

The MRI system 100 may also include one or more networked workstations 142. For example, a networked workstation 142 may include a display 144, one or more input devices 146 (e.g., a keyboard, a mouse), and a processor 148. The networked workstation 142 may be located within the same facility as the operator workstation 102, or in a different facility, such as a different healthcare institution or clinic.

The networked workstation 142 may gain remote access to the data processing server 114 or data store server 116 via the communication system 140. Accordingly, multiple networked workstations 142 may have access to the data processing server 114 and the data store server 116. In this manner, magnetic resonance data, reconstructed images, or other data may be exchanged between the data processing server 114 or the data store server 116 and the networked workstations 142, such that the data or images may be remotely processed by a networked workstation 142.

As discussed above, MRF is a quantitative alternative to MRI that simultaneously measures two or more tissue properties, for example, $T_1$ and $T_2$, in a single scan. MRF quantification is independent of age or contrast, making it a prime candidate for age-agnostic segmentation. Rather than using MR contrast-weighted images with low contrast to noise ratio (CNR) in images of a subject such as, for example, a baby, MRF can provide countless image contrasts via synthesis from signal evolutions or quantitative maps that highlight tissues and boundaries for segmentation.

The present disclosure describes a system and method for generating segmented images of a region of interest of a subject using MRF and unsupervised clustering. In some embodiments, the disclosed MRF-based segmentation method selects MRF-based images to produce unsupervised tissue segmentations using a multi-image clustering approach. In some embodiments, the disclosed MRF-based method for image segmentation can be used for segmentation of neonatal brains. In some embodiments, the disclosed MRF-based method for image segmentation can be used for segmentation of regions of interest (e.g., a brain) of a subject of any age. For segmentation of neonatal brain, most prior segmentation methods rely on qualitative weighted images that must be acquired one at a time, whereas the disclosed MRF-based segmentation technique advantageously leverages MRF's measurement of multiple quantitative tissue properties to refine segmentations by observing multi-feature cluster trends. The disclosed MRF-based image segmentation method advantageously utilizes an unsupervised clustering-based approach that is age-agnostic by avoiding atlas fitting for segmentation, the most common status quo segmentation method. Multi-feature MRF data can allow for clustering of tissue voxels into similar feature groups without assumptions or ground truth references, which are difficult to acquire for certain subjects such as, for example. neonates. In some embodiments, the disclosed MRF-based image segmentation method with unsupervised clustering may be used to segment additional tissue classes based on the cluster fitting to the MRF data, which can, for example, identify neonate-specific tissue such as myelination that are missed by the status quo due to atlas assumptions limiting the expected number of tissues. The disclosed MRF-based image segmentation method with unsupervised clustering can advantageously provide an age-agnostic, unsupervised segmentation of a region of interest such as, for example, the brain.

In some embodiments, the MRF-based image segmentation method can use MRF-derived image features and density-based clustering to segment, for example, two-dimensional (2D) or three-dimensional (3D) brain slices from subjects without assumptions about subject age, brain shape, or image intensity. Segmentations from the disclosed image segmentation method can achieve better segmentation performance than prior image segmentation methods such as, for example, statistical parametric mapping (SPM) without needing different atlases for subjects of varying ages. With flexible assumptions about the number of tissues present in an image, the disclosed image segmentation method can identify additional tissues such as, for example, cerebrospinal fluid (CSF) partial volume voxels and neonatal myelination that are not segmented by atlas-based approaches.

Figure 2:
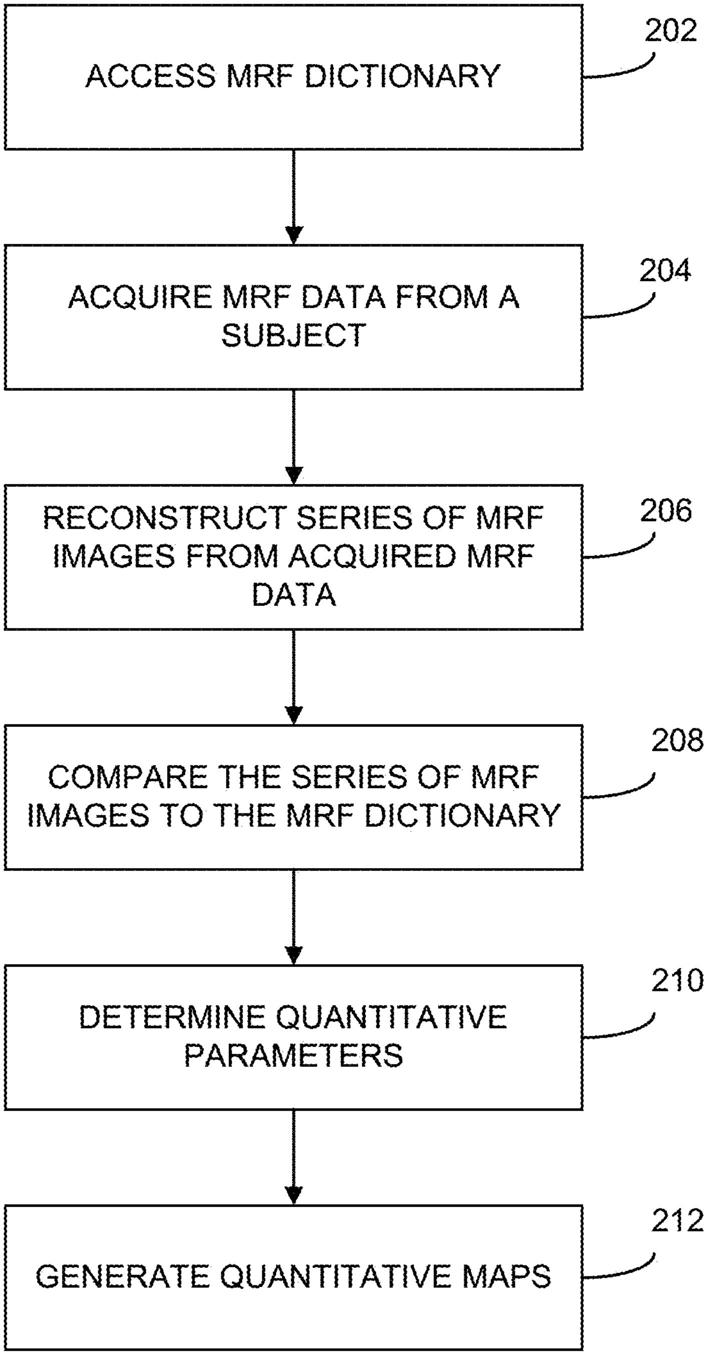
FIG. 2 illustrates an example method for generating images and quantitative parameter maps using magnetic resonance fingerprinting (MRF) in accordance with an embodiment.

FIG. 2 illustrates an example method for generating images and quantitative maps using magnetic resonance fingerprinting (MRF) in accordance with an embodiment. Although the blocks of the process of FIG. 2 are illustrated on a particular order, in some embodiments, one or more blocks may be executed in a different order than illustrated in FIG. 2, or may be bypassed. At block 202, an MRF dictionary is accessed. The MRF dictionary can include known signal evolutions (e.g., simulated signal evolutions) and can include parameters and properties (e.g., quantitative parameters or property values) associated with each signal evolution, for example, $T_1$, $T_2$, $T_2$*, proton density, off-resonance, diffusivity, or diffusion tensor. In some embodiments, the MRF dictionary may be generated using a Bloch simulation or Bloch-Torrey equation. In some embodiments, the MRF dictionary may be stored in memory or data storage of, for example, an MRI system (e.g., MRI system 100 shown in FIG. 1) or other computer system. As used herein, the term "accessing" may refer to any number of activities related to retrieving or processing the MRF dictionary using, for example, MRI system 100 (shown in FIG. 1), an extended network, information repository, or combinations thereof. In some embodiments, the MRF dictionary may be a compressed MRF dictionary. For example, the MRF dictionary may be compressed using a known compression method such as, for example, singular value decomposition (SVD) or randomized SVD (rSVD).

At block 204, MRF data may be acquired from a subject, for example, from a tissue or region of interest in a subject. In some embodiments, the region of interest can be an organ or other anatomy of the subject such as, for example, the brain. The MRF data may be acquired using, for example, an MRI system (e.g., MRI system 100 shown in FIG. 1). Acquiring MRF data may include performing or playing-out a pulse sequence using a series of varied sequence blocks to elicit a series of signal evolutions from tissue(s) in the region of interest, for example, signals and signal evolutions from each image element (e.g., pixel or voxel) in the region of interest. In some embodiments, the pulse sequence may be based on sequences such as, for example, fast imaging with steady-state free precession (FISP), FLASH, TrueFISP, gradient echo, spin echo, etc. An MRF acquisition (e.g., MRF, mdMRF, qRF-MRF, etc.) can be configured to simultaneously quantify parameters such as, for example, $T_1$, $T_2$, $T_2$*, proton density diffusivity, and diffusion tensor. In some embodiments, the acquired MRF data may be stored in memory or data storage of, for example, an MRI system (e.g., the MRI system 100 of FIG. 1) or other computer system. In some embodiments, the acquired MRF data may be compressed using a known compression method such as, for example, singular value decomposition (SVD).

In some embodiments, at block 206 the MRF data may be reconstructed before comparison with the MRF dictionary at block 208. For example, in some embodiments a series of time-resolved MRF images may be reconstructed at block 206 from the acquired MRF data. In some embodiments, the MRF image(s) may be reconstructed using known reconstruction methods such as, for example, a non-uniform Fast Fourier Transform (NUFFT). In some embodiments, the reconstructed MRF images may be stored in memory or data storage of, for example, an MRI system (e.g., the MRI system 100 of FIG. 1) or other computer system.

The reconstructed MRF images from block 206 (or the MRF data acquired at bock 204) may be compared to the MRF dictionary at block 208 to match the acquired signal evolutions with signal evolutions stored in the MRF dictionary. "Match" as used herein refers to the result of comparing signals but does not refer to an exact match, which may or may not be found. A match may be the signal evolution that most closely resembles another signal evolution. Comparing the MRF data (or reconstructed images) to the MRF dictionary may be performed in a number of ways such as, for example, using a pattern matching, template matching or other matching algorithm. In some embodiments, dot product pattern matching may be used to select the MRF dictionary entry which most closely fits the acquired signal evolution to extract, for example, $T_1$, $T_2$, and diffusivity or diffusion tensor, for each pixel. In some embodiments, the inner products between the normalized time course of each pixel and all entries of the normalized dictionary are calculated, and the dictionary entry corresponding to the maximum value of the inner product is taken to represent the closest signal evolution to the acquired signal evolution. In some embodiments, iterative pattern matching may be used.

At block 210, one or more quantitative parameters (e.g., relaxation or diffusion parameters) of the MRF data may be determined based on the comparison and matching at block 208. For example, based on the comparison and matching in block 208, the signal evolution (i.e., a dictionary entry) that is determined to be the closest signal evolution (or closest fit) to the acquired signal evolutions may be selected and the parameters associated with the selected dictionary entry assigned to the acquire signal evolutions. The parameters may include, for example, longitudinal relaxation time ($T_1$), transverse relaxation time ($T_2$), main or static magnetic field ($B_0$), proton density, diffusion or diffusion tensor. In some embodiments, the determined quantitative parameters may be stored in memory or data storage of, for example, an MRI system (e.g., MRI system 100 shown in FIG. 1) or other computer system.

At block 212, images or maps may be generated indicating at least one of the quantitative parameters determined at block 210 for the tissue(s) in the region of interest in the subject. For example, a quantitative map may be generated having a quantitative indication of at least one quantitative parameter. In some embodiments, the quantitative parameter maps or images may be stored in memory or data storage of, for example, an MRI system (e.g., MRI system 100 shown in FIG. 1) or other computer system. In some embodiments, a report may be generated indicating at least one of the identified parameters (e.g., relaxation parameters) for the tissue in a region of interest in a subject. For example, the report may include a quantitative indication of the at least one parameter. The report may include, for example, images or maps, text or metric based reports, audio reports and the like. The report may be provided to a display (e.g., display 104, 136 or 144 shown in FIG. 1). In some embodiments, the report may be stored in memory or data storage of, for example, an MRI system (e.g., MRI system 100 shown in FIG. 1) or other computer system.

Figure 3:
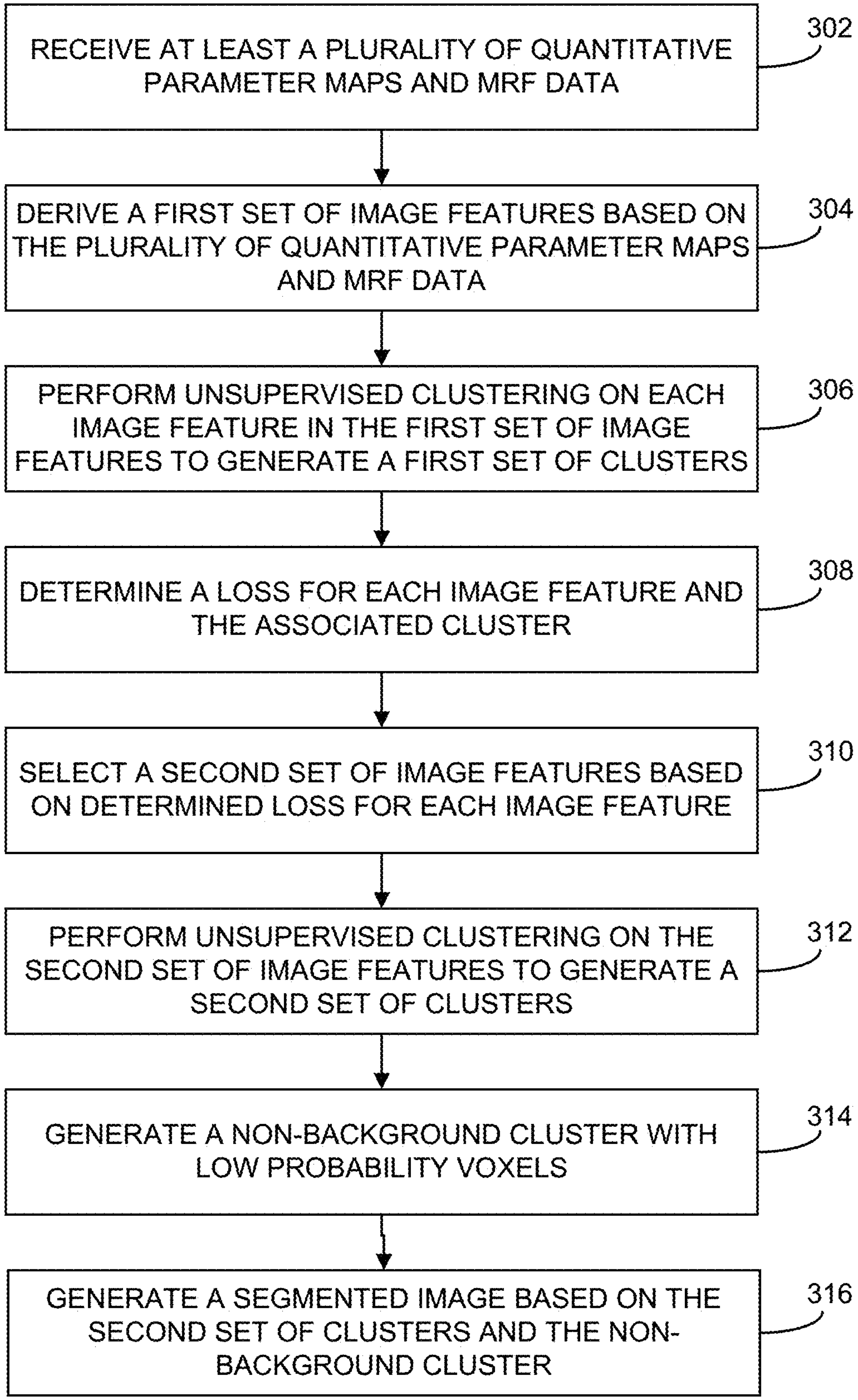
FIG. 3 illustrates a method for generating segmented images of a region of interest of a subject using MRF in accordance with an embodiment.

While the following discussion of FIGS. 3-7 will be discussed in terms of image segmentation of the brain it should be understood that the disclosed image segmentation method can be used to generate segmented images of other regions of interest in the subject (e.g., other organs of the subject). FIG. 3 illustrates a method for generating segmented images of a region of interest of a subject using MRF in accordance with an embodiment. Although the blocks of the process of FIG. 3 are illustrated on a particular order, in some embodiments, one or more blocks may be executed in a different order than illustrated in FIG. 3, or may be bypassed.

At block 302, inputs including at least a plurality of quantitative parameter maps and MRF data for the region of interest may be received from, for example, an MRI system (e.g., MRI system 100 shown in FIG. 1). In some embodiments, MRF data can be acquired, for example, as described above with respect to FIG. 2. In addition, in some embodiments, the plurality of quantitative parameter maps (e.g., $T_1$ and $T_2$ maps) can be generated from the MRF data, for example, as described above with respect to FIG. 2. In some embodiments, other inputs to the segmentation method can be received including, for example, MRF images, an MRF dictionary, and mask(s) related to the region of interest (e.g., for brain segmentation, a brain mask). In some embodiments, the plurality of quantitative parameter maps, MRF data and other inputs can be received or retrieved from data storage (or memory) of an imaging system (e.g., disc storage 138 of MRI system 100 shown in FIG. 1) or data storage of other computer systems (e.g., storage device 816 of computer system 800 shown in FIG. 1).

At block 304, a first set of image features may be derived (or synthesized) based on the plurality of quantitative parameter maps. For example, in some embodiments, clinical contrast-weighted images (e.g., $T_1$w, $T_2$w, FLAIR, other custom contrasts, etc.) can be synthesized from the plurality of quantitative parameter maps (e.g., $T_1$ and $T_2$ maps). In addition, the plurality of quantitative parameter maps can be used to generate signal component magnitude and phase images using SVD. For example, MRF signal evolutions can be simulated voxel-wise per $T_1$-$T_2$ pair from the $T_1$ and $T_2$ parameter maps and SVD compressed to create signal component magnitude images. In some embodiments, the SVD phase images can be binarized and combined to create a discretized image feature. In some embodiments, noise (e.g., +0.5% of standard deviation uniformly distributed noise) can be added to each image feature to prevent division by zero for distances between values, i.e., to prevent zero-distance clustering errors.

At block 306, an unsupervised clustering technique can be performed on each image feature in the first set of image features to generate a first set of clusters (and associated cluster labels). In some embodiments, the unsupervised clustering technique can be, for example, the Hierarchical Density-Based Spatial Clustering of Applications with Noise (HDBSCAN). While the following discussion of FIGS. 3-7 will be discussed in terms of the HDBSCAN unsupervised clustering method it should be understood that the disclosed MRF-based segmentation method may use other unsupervised clustering methods. The unsupervised clustering can be performed to generate a predetermined number of clusters (and associated cluster labels), for example, three (n=3) clusters. In some embodiments, each cluster label may be intensity corrected to the median of the feature voxels of that label, creating median intensity cluster labels and a segmentation image that resembles the feature image.

At block 308, a loss for each image feature in the first set of image features and the associated cluster for the image feature can be determined. In some embodiments, the loss can be determined between the image feature and its intensity corrected median intensity cluster label. In some embodiments, the loss can be determined by calculating a spatial and frequency L2-norm loss for each image feature and its associated clustering. For example, a combined image domain L2-norm and frequency domain magnitude L2-norm loss function can be used to evaluate how each image feature divides into distinct tissue types and can be given by:

$$L(f,1)=\lambda 1\sum\|f-1\|2+\lambda 2\sum\big\||F|-|L|\big\|2L(f,1)=\lambda 1\sum\|f-1\|2+\lambda 2\sum\||F|-|L\||2 \tag{5}$$

where f is feature, l is intensity-corrected label, F and L are Fourier transforms of f and l, and λ are scalars.

At block 310, a second set of image features may be selected from the first set of image features based on the determined loss for each image feature in the first set of image features. In some embodiments, the second set of image features can be determined by selecting a predetermined number of image features with a loss below a predetermined threshold. For example, the image features with minimal loss, L (e.g., as determined with Equation 5 above), may be selected and compiled into the second set of image features. In some embodiments, before selecting the image features for the second set of image features, the image features in the first set of image features may be evaluated or analyzed to identify if any of the image features are artifact corrupted. If any image feature is identified as being corrupted, the image feature and any other features derived from it may be discarded before selecting the second set of image features. In some embodiments, artifact corrupted features may be identified by an input provided by a user. In some embodiments, the identification of artifact corrupted features may be automated.

At block 312, an unsupervised clustering technique (e.g., HDBSCAN) can be performed on each image feature in the second set of image features to generate a second set of clusters (and associated cluster labels). In some embodiments, the unsupervised clustering can be performed to generate a predetermined number of clusters (and associated cluster labels). In some embodiments, the unsupervised clustering of the second set of image features can generate a soft clustering. At block 314, voxels with a low probability of belonging to any of the clusters in the second set of clusters may be assigned to a non-background cluster. In some embodiments, the low probability voxels can correspond to situationally unique tissues such as, for example, CSF partial volume voxels or infant myelination. At block 316 a segmented image may be generated based on the second set of clusters and the non-background cluster. Accordingly, the disclosed method for generating segmented images of a region of interest of a subject using MRF can produce a final segmented image without using an atlas or an age assumption.

In summary, in the disclosed MRF-based image segmentation method using unsupervised clustering as described above with reference to FIG. 3, image features can be derived from acquired MRF quantitative parameter maps and images (or MRF data) and then individually clustered. In some embodiments, loss between an image feature and its intensity corrected median intensity cluster labels can describe that feature's utility in clustering the image into distinct tissue regions. In some embodiments, the image features with, for example, the lowest losses can be selected for a second and final multi-feature clustering after poor features are disqualified, which can result in a segmented image of a predetermined number of tissue classes and potentially an outlier tissue class (e.g., based on the non-background cluster), for example, the segmented image can include three tissue classes (or clusters) and one outlier tissue class (or cluster). Advantageously, the disclosed image segmentation method is an age-agnostic tissue segmentation method using MRF or other MRF-based sequences such as mdMRF, qRF-MRF, etc. In some embodiments, the disclosed MRF-based image segmentation method may be used for 3D segmentation. In some embodiments, spatial regularization may be incorporated for smoother segmentation maps.

The following examples set forth, in detail, ways in which the present disclosure was evaluated and ways in which the present disclosure may be used or implemented, and will enable one of ordinary skill in the art to more readily understand the principles thereof. The following examples are presented by way of illustration and are not meant to be limiting in any way.

Figure 4:
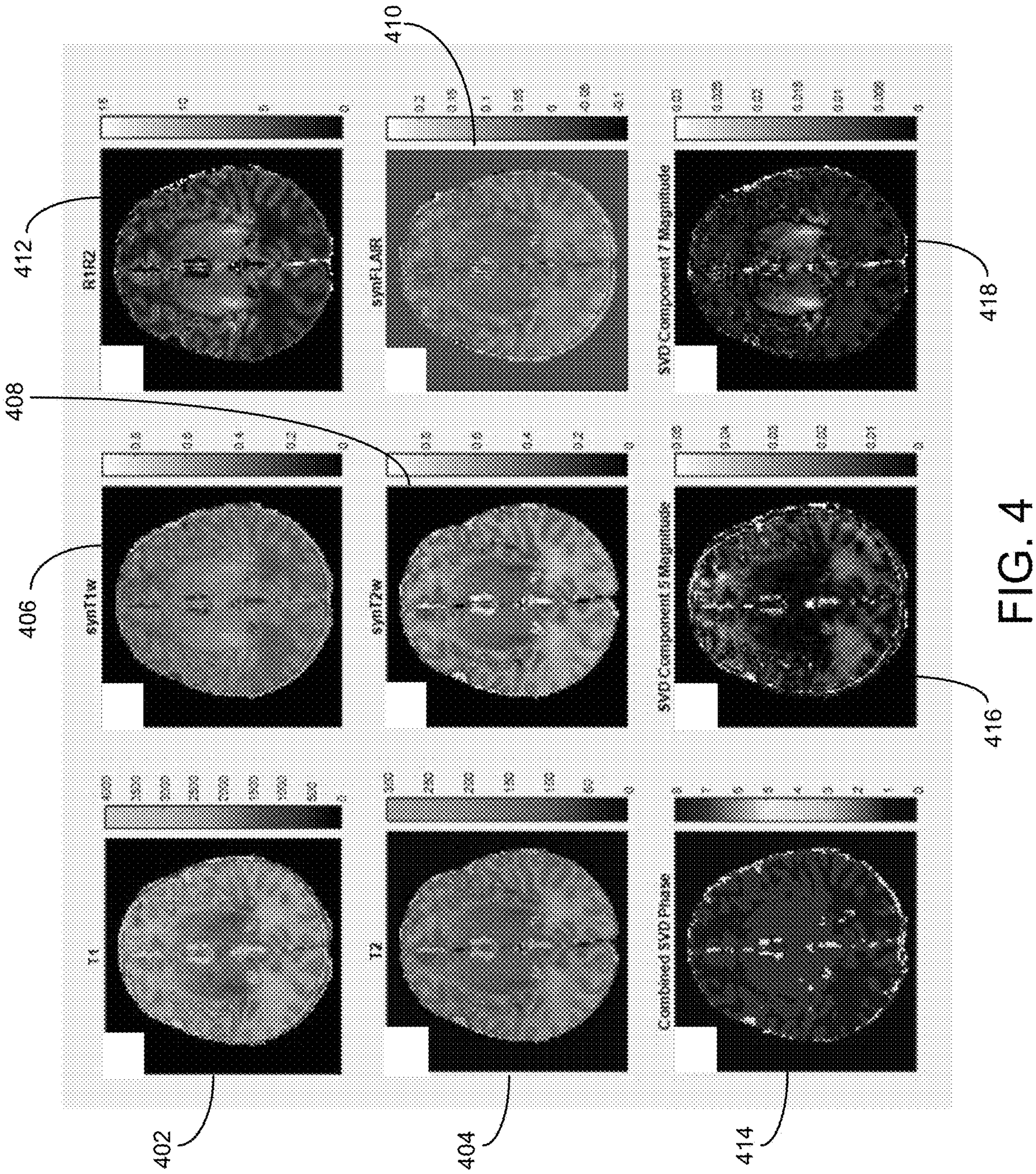
FIG. 4 shows example synthesized image features for a neonate MRF scan in accordance with an embodiment.

FIG. 4 shows example synthesized image features for a neonate MRF scan (10 days) in accordance with an embodiment. FIG. 4 shows a $T_1$ map and a $T_2$ map generated using MRF data from the neonate MRF scan. In addition, FIG. 4 shows synthesized clinical contrasts including $T_1$w (syn$T_1$w) 406, $T_2$w (syn$T_2$w) 408, FLAIR (synFLAIR) 410, and a custom contrast R1R2 412, as well as synthesized SVD component phase and magnitude images including a combined phase image 414 of 8 SVD components, a magnitude image 416 of SVD component 5, and a magnitude image 418 of SVD component 7. As mentioned above, the clinical contrasts and the SVD component phase and magnitude images can be synthesized using the quantitative parameter maps $T_1$ 402 and $T_2$ 404. In this example study, after a loss calculation for each image feature (as described above with respect to FIG. 3), 3 SVD features were automatically chosen for final clustering based on the loss calculation, namely, the composite SVD phase 414, and the magnitude of two SVD components 416, 418 which naturally delineate tissues.

In this example study, clustering was performed on 2D MRF slices from subjects of varying age (24-years old, 10-day-old, 9-month old) to investigate generalization across age. Reference clustering was performed on synthetic $T_1$w images using statistical parametric mapping (SPM) with age-appropriate atlases. DICE coefficients were calculated for grey matter, white matter, and CSF between the disclosed MRF-based image segmentation method and SPM. The example study illustrated reasonable segmentation of grey and white matter without assumptions about contrast between tissue types. In this example study, DICE scores between the disclosed MRF-based segmentation method and SPM of grey matter across 3 subjects of varying age was 0.810±0.110, white matter 0.7832±0.145, and CSF 0.604±0.236. Low CSF scores may be caused by differing segmentations of CSF partial volume voxels.

Figure 5:
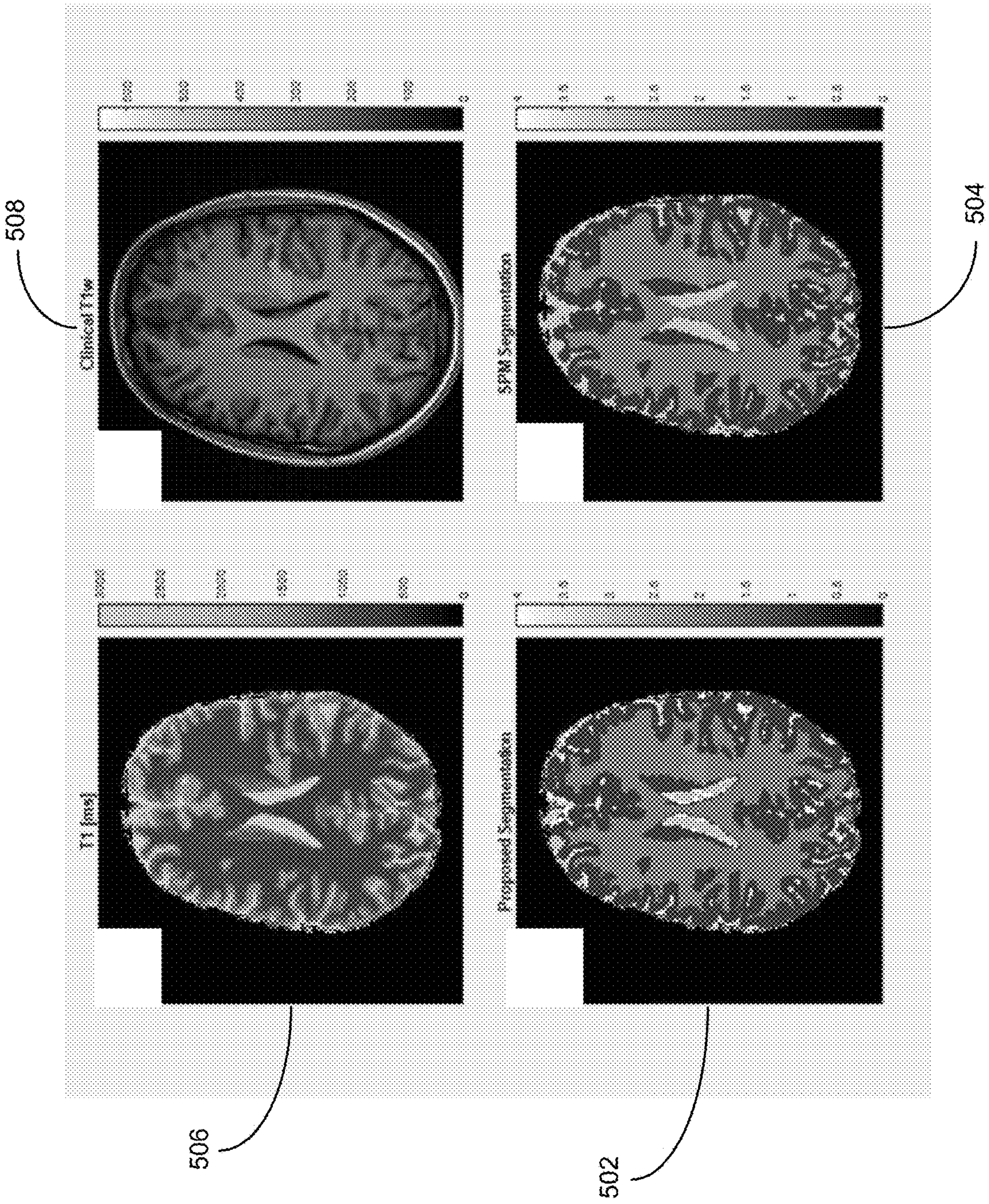
FIG. 5 shows example segmentation results compared to statistical parametric mapping (SPM), a reference $T_1$ map, and clinical $T_1$w image for an adult subject in accordance with an embodiment.

FIG. 5 shows example segmentation results compared to statistical parametric mapping (SPM), a reference $T_1$ map, and clinical $T_1$w image for an adult subject in accordance with an embodiment. In FIG. 5, example segmentation results of the disclosed MRF-based image segmentation method in a 24-year old adult axial slice are illustrated in a segmented image 402 and compared to segmentation results for SPM in the 24-year old adult axial slice which is illustrated in the segmented image 404. FIG. 5 also shows a reference $T_1$ map 406, and a clinical $T_1$w image 408 in the 24-year old adult axial slice. In this example, in the 24-year-old adult, grey matter DICE agreement was 0.9208, white matter 0.9502, and CSF 0.5375. Grey and white matter regions from the two methods are similar, but there is significant differences in CSF, where the disclosed MRF-based image segmentation method identifies CSF partial volume voxels as distinct from the tissue types in the SPM atlas. In particular, the MRF-based image segmentation method can segment an additional tissue cluster at the CSF-tissue boundary that corresponds to voxels with partial CSF volume, impacting the CSF DICE score (0.5375).

Figure 6:
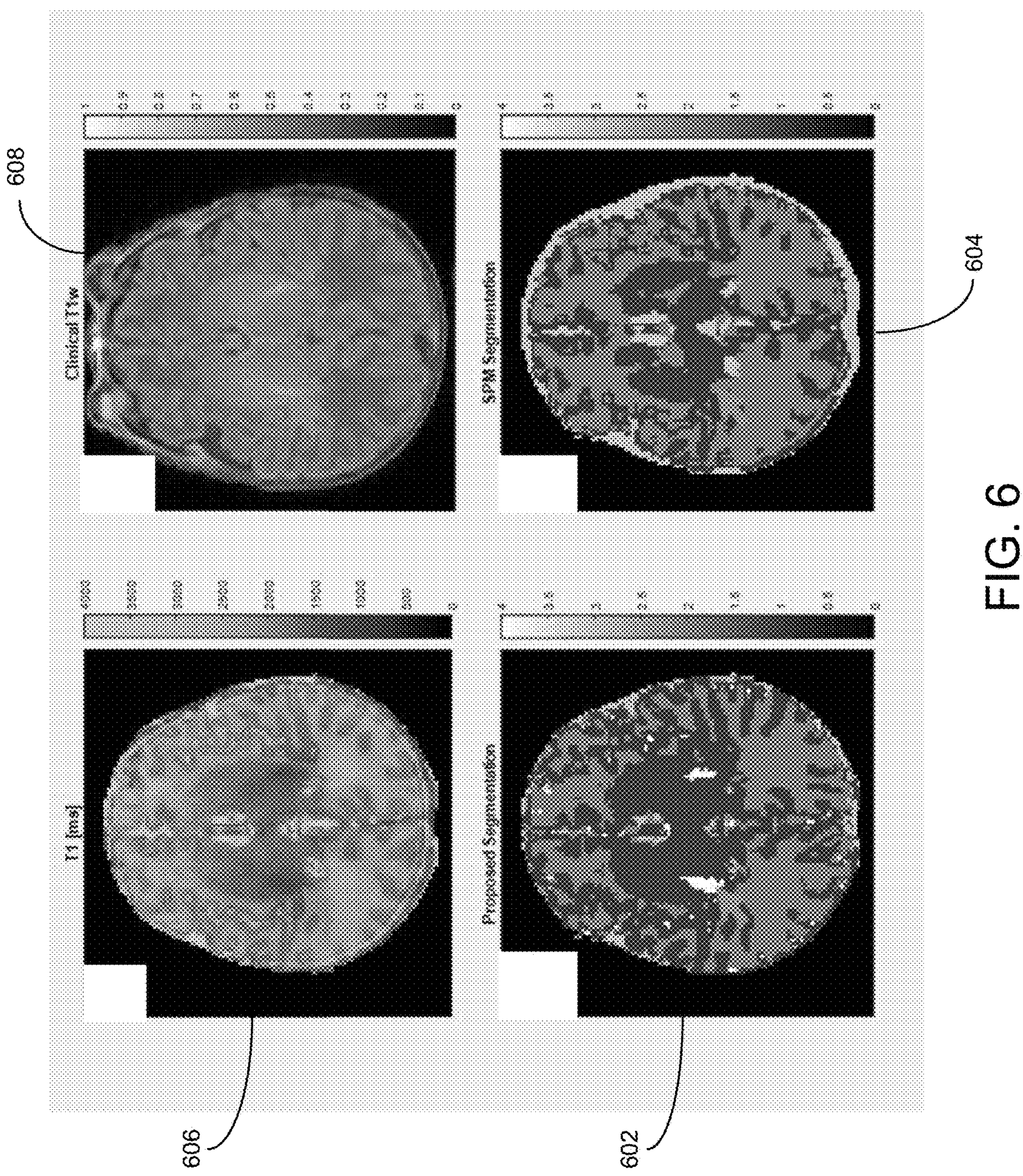
FIG. 6 shows example segmentation results compared to SPM, a reference $T_1$ map, and a clinical $T_1$w image for a neonate subject in accordance with an embodiment.

FIG. 6 shows example segmentation results compared to SPM, a reference $T_1$ map, and a clinical $T_1$w image for a neonate subject in accordance with an embodiment. In FIG. 6, example segmentation results for the disclosed MRF-based image segmentation method for a 10-day old neonate subject are illustrated in a segmented image 602 and compared to segmentation results for SPM for the 10-day old neonate subject which is illustrated in the segmented image 604. FIG. 6 also shows a reference $T_1$ map 606 and a clinical $T_1$w image 608 for the 10-day old neonate subject. In this example, in the 10-day-old neonate, the grey matter DICE score compared to SPM was 0.7005, white matter 0.7037, and CSF 0.4085. CSF DICE is impacted by SPM's ring of CSF around the brain, a limitation of the atlas misclassifying non-brain tissue. Grey and white matter segmentation is similar, though SPM segments the internal capsule via atlas assumptions despite the anatomy being poorly quantitatively differentiated. CSF is over-predicted by SPM relative to the disclosed MRF-based image segmentation method. SPM requires a 0-year-old (0 YO) atlas for segmentation, but the assumptions of the disclosed image segmentation method do not change. An additional cluster can be segmented around myelination in the basal ganglia (subcortical myelination) using the disclosed MRF-based image segmentation method, which is missed by SPM due to atlas limitations.

Figure 7:
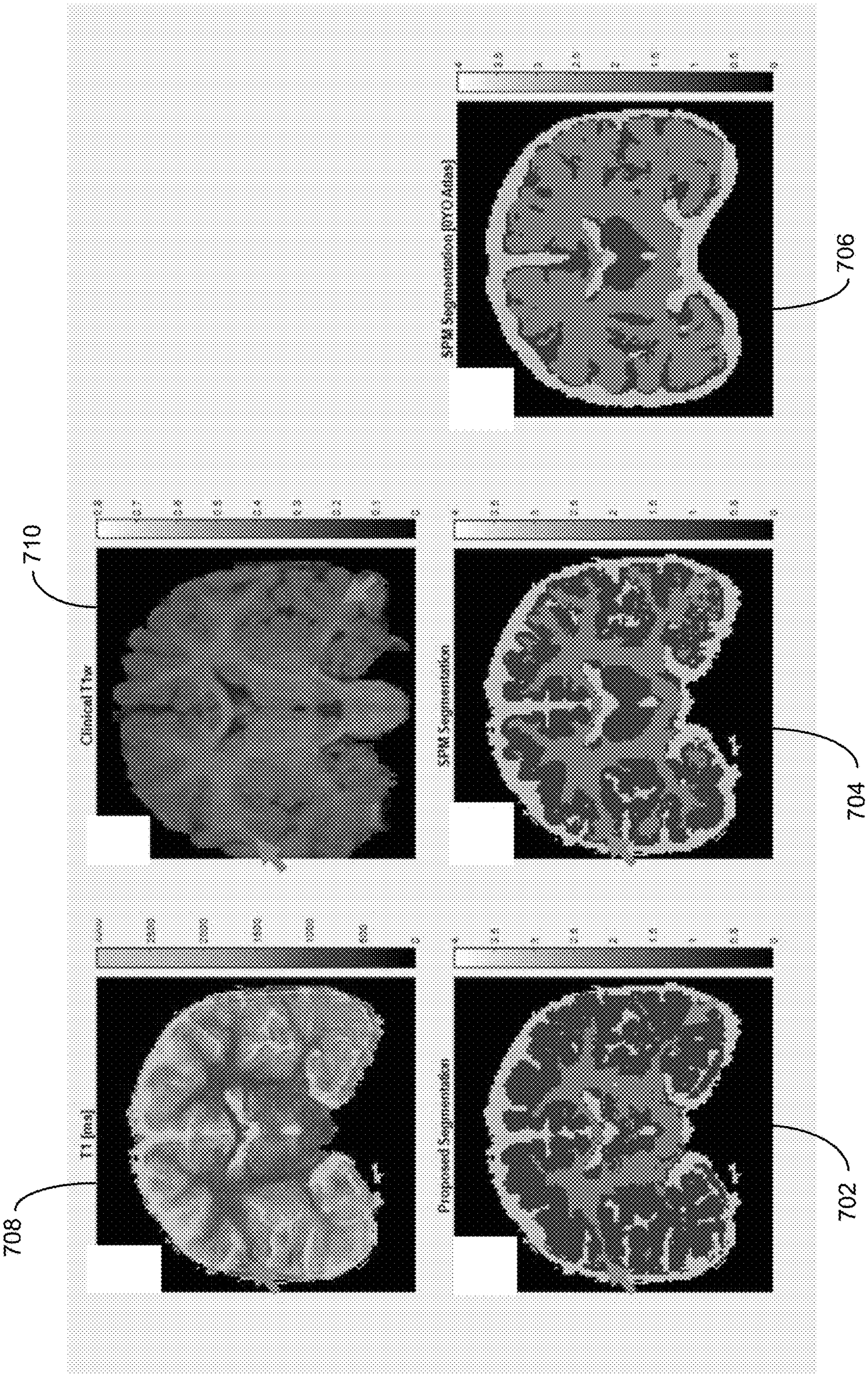
FIG. 7 shows example segmentation results comparted to SPM, reference $T_1$ map, and a clinical $T_1$w image for an infant subject in accordance with an embodiment.

FIG. 7 shows example segmentation results comparted to SPM, reference $T_1$ map, and a clinical $T_1$w image for an infant subject in accordance with an embodiment. In FIG. 7, example segmentation results of the disclosed MRF-based image segmentation method for a 9-month old infant subject coronal slice are illustrated in a segmented image 702 and comparted to (a) segmentation results for SPM for the 9-month old infant subject coronal slice which is illustrated in the segmented image 704 which was generated with a 1-year-old (1 YO) atlas, and (b) segmentation results for SPM for the 9-month old infant subject coronal slice which is illustrated in the segmented image 706 which was generated with a 0-year-old (0 YO) atlas. FIG. 7 also shows a reference $T_1$ map 708 and and a clinical $T_1$w image 710 for the 9-month-old infant subject coronal slice. In this example, the subject has reduced differentiation between grey and white matter due to incomplete contrast inversion. 0 YO SPM segmentation 706 fails to differentiate grey and white matter, while 1 YO SPM segmentation 704 imperfectly segments white matter because of imperfect atlas assumptions above contrast. For the more similar 1 YO SPM segmentation 704 compared to the disclosed MRF-based image segmentation method 702, DICE scores were 0.8072 for grey matter, 0.6958 white matter, and 0.8661 for CSF.

Figure 8:
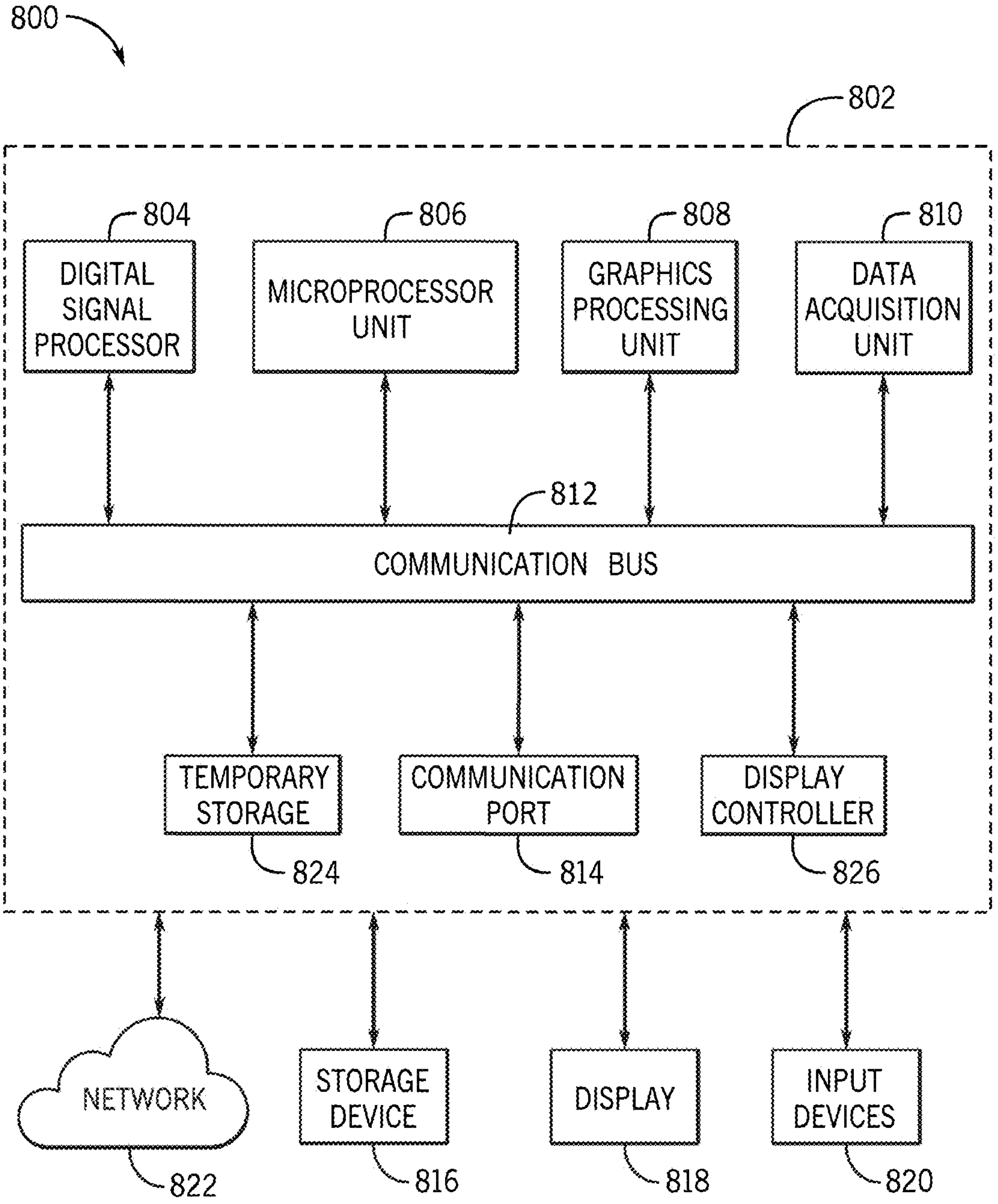
FIG. 8 is a block diagram of an example computer system in accordance with an embodiment.

FIG. 8 is a block diagram of an example computer system in accordance with an embodiment. Computer system 800 may be used to implement the systems and methods described herein. In some embodiments, the computer system 800 may be a workstation, a notebook computer, a tablet device, a mobile device, a multimedia device, a network server, a mainframe, one or more controllers, one or more microcontrollers, or any other general-purpose or application-specific computing device. The computer system 800 may operate autonomously or semi-autonomously, or may read executable software instructions from the memory or storage device 816 or a computer-readable medium (e.g., a hard drive, a CD-ROM, flash memory), or may receive instructions via the input device 820 from a user, or any other source logically connected to a computer or device, such as another networked computer or server. Thus, in some embodiments, the computer system 800 can also include any suitable device for reading computer-readable storage media.

Data, such as data acquired with, for example, an imaging system (e.g., a magnetic resonance imaging (MRI) system, etc.), may be provided to the computer system 800 from a data storage device 816, and these data are received in a processing unit 802. In some embodiments, the processing unit 802 included one or more processors. For example, the processing unit 802 may include one or more of a digital signal processor (DSP) 804, a microprocessor unit (MPU) 806, and a graphic processing unit (GPU) 808. The processing unit 802 also includes a data acquisition unit 810 that is configured to electronically receive data to be processed. The DSP 804, MPU 806, GPU 808, and data acquisition unit 810 are all coupled to a communication bus 812. The communication bus 812 may be, for example, a group of wires, or a hardware used for switching data between the peripherals or between any component in the processing unit 802.

The processing unit 802 may also include a communication port 814 in electronic communication with other devices, which may include a storage device 816, a display 818, and one or more input devices 820. Examples of an input device 820 include, but are not limited to, a keyboard, a mouse, and a touch screen through which a user can provide an input. The storage device 816 may be configured to store data, which may include data such as, for example, MRF data, MRF images, quantitative maps, synthesized images, image features, quantitative parameters, segmented images, etc., whether these data are provided to, or processed by, the processing unit 802. The display 818 may be used to display images, reports, and other information, such as patient health data, and so on.

The processing unit 802 can also be in electronic communication with a network 822 to transmit and receive data and other information. The communication port 814 can also be coupled to the processing unit 802 through a switched central resource, for example the communication bus 812. The processing unit 802 can also include temporary storage 824 and a display controller 826. The temporary storage 824 is configured to store temporary information. For example, the temporary storage 824 can be a random-access memory.

Computer-executable instructions for generating segmented images of a region of interest of a subject using MRF according to the above-described methods may be stored on a form of computer readable media. Computer readable media includes volatile and nonvolatile, removable, and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital volatile disks (DVD) or other optical storage, magnetic cassettes, magnetic tape, magnetic disk storage or other magnetic storage devices, or any other medium which can be used to store the desired instructions and which may be accessed by a system (e.g., a computer), including by internet or other computer network form of access.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for generating segmented images of a region of interest of a subject using magnetic resonance fingerprinting (MRF), the method comprising:

receiving MRF data and a plurality of quantitative parameter maps generated using the MRF data;

deriving a first set of image features based on the plurality of quantitative parameter maps and the MRF data;

performing unsupervised clustering on each image feature in the first set of image features to generate a first set of clusters;

determining a loss for each image feature in the first set of image features and the associated cluster for the image feature;

selecting a second set of image features based on the determined loss for each image feature in the first set of image features, wherein the second set of image features comprises image features having a loss below a predetermined threshold;

performing unsupervised clustering on the second set of image features to produce a second set of clusters;

generating a non-background cluster with low probability voxels; and generating a segmented image based on the second set of clusters and the non- background cluster.

2. The method according to claim 1, wherein the region of interest of the subject is a brain.

3. The method according to claim 1, wherein deriving a first set of image features based on the plurality of quantitative parameter maps comprises generating a set of contrast-weighted images and a set of SVD phase and magnitude images.

4. The method according to claim 1, wherein performing unsupervised clustering on each image feature in the first set of image features to generate a first set of clusters comprises adding noise to each image feature in the first set of image features before performing the unsupervised clustering.

5. The method according to claim 1, wherein the first set of clusters includes a cluster label for each cluster and wherein determining a loss for each image feature in the first set of image features and the associated cluster for the image feature comprises:

correcting the intensity of each cluster label for the first set of clusters; and calculating a spatial and frequency L2-norm loss for each image feature and the associated cluster for the image feature.

6. The method according to claim 1, wherein selecting the second set of image features based on the determined loss for each image feature in the first set of image features further comprises before selecting the predetermined number of image features with a loss below a predetermined threshold:

identifying image features in the first set of image features that are artifact corrupted; and discarding artifact corrupted image features from the first set of image features.

7. The method according to claim 1, wherein the plurality of quantitative parameter maps includes one or more of a $T_1$ parameter map and a $T_2$ parameter map.

8. The method according to claim 1, wherein the unsupervised clustering is a Hierarchical Density-Based Spatial Clustering of Application with Noise (HDBSCAN).

9. The method of claim 1, wherein deriving the first set of image features comprises generating a set of contrast-weighted images and a set of SVD phase and magnitude images from the plurality of quantitative parameter maps and the MRF data.

10. The method of claim 1, wherein determining the loss comprises correcting the intensity of each cluster label for the first set of clusters and calculating a spatial and frequency L2-norm loss for each image feature and the associated cluster for the image feature.

11. The method of claim 1, wherein generating the non-background cluster includes assigning voxels having a low probability of belonging to any of the clusters in the second set of clusters to the non-background cluster.

12. A magnetic resonance imaging (MRI) system comprising:

a magnet system configured to generate a polarizing magnetic field about a at least a portion of a subject;

a magnetic gradient system including a plurality of magnetic gradient coils configured to apply at least one magnetic gradient field to the polarizing magnetic field;

a radio frequency (RF) system configured to apply an RF excitation field to the subject, and to receive magnetic resonance signals from the subject using a coil array; and at least one processor configured to:

direct the plurality of magnetic gradient coils and the RF system to perform a magnetic resonance fingerprinting (MRF) pulse sequence to acquire MRF data;

generate a plurality of quantitative parameter maps using the acquired MRF data;

derive a first set of image features based on the plurality of quantitative parameter maps and the MRF data;

perform unsupervised clustering on each image feature in the first set of image features to generate a first set of clusters;

determine a loss for each image feature in the first set of image features and the associated cluster for the image feature;

select a second set of image features based on the determined loss for each image feature in the first set of image features, wherein the second set of image features comprises image features having a loss below a predetermined threshold;

perform unsupervised clustering on the second set of image features to produce a second set of clusters;

generate a non-background cluster with low probability voxels; and generate a segmented image based on the second set of clusters and the non- background cluster.

13. The system according to claim 12, wherein the region of interest of the subject is a brain.

14. The system according to claim 12, wherein deriving a first set of image features based on the plurality of quantitative parameter maps comprises generating a set of contrast-weighted images and a set of SVD phase and magnitude images.

15. The system according to claim 12, wherein performing unsupervised clustering on each image feature in the first set of image features to generate a first set of clusters comprises adding noise to each image feature in the first set of image features before performing the unsupervised clustering.

16. The system according to claim 12, wherein the first set of clusters includes a cluster label for each cluster and wherein determining a loss for each image feature in the first set of image features and the associated cluster for the image feature comprises:

correcting the intensity of each cluster label for the first set of clusters; and calculating a spatial and frequency L2-norm loss for each image feature and the associated cluster for the image feature.

17. A non-transitory, computer readable medium storing instructions that, when executed by one or more processors, perform a set of functions, the set of functions comprising:

receiving MRF data and a plurality of quantitative parameter maps generated using the MRF data;

deriving a first set of image features based on the plurality of quantitative parameter maps and the MRF data;

performing unsupervised clustering on each image feature in the first set of image features to generate a first set of clusters;

determining a loss for each image feature in the first set of image features and the associated cluster for the image feature;

selecting a second set of image features based on the determined loss for each image feature in the first set of image features, wherein the second set of image features comprises image features having a loss below a predetermined threshold;

performing unsupervised clustering on the second set of image features to produce a second set of clusters;

generating a non-background cluster with low probability voxels; and generating a segmented image based on the second set of clusters and the non- background cluster.

18. The non-transitory computer readable medium according to claim 17, wherein deriving a first set of image features based on the plurality of quantitative parameter maps comprises generating a set of contrast-weighted images and a set of SVD phase and magnitude images.

19. The non-transitory computer readable medium according to claim 17, wherein performing unsupervised clustering on each image feature in the first set of image features to generate a first set of clusters comprises adding noise to each image feature in the first set of image features before performing the unsupervised clustering.

20. The non-transitory computer readable medium according to claim 17, wherein the first set of clusters includes a cluster label for each cluster and wherein determining a loss for each image feature in the first set of image features and the associated cluster for the image feature comprises:

correcting the intensity of each cluster label for the first set of clusters; and calculating a spatial and frequency L2-norm loss for each image feature and the associated cluster for the image feature.

* * * * *